United States Patent [19]
Tanaka

[11] Patent Number: 5,347,114
[45] Date of Patent: Sep. 13, 1994

[54] BAR CODE SYMBOL READING APPARATUS

[75] Inventor: Hisakatsu Tanaka, Tokyo, Japan

[73] Assignee: Olympus Optical Co., Ltd., Tokyo, Japan

[21] Appl. No.: 957,406

[22] Filed: Oct. 6, 1992

[30] Foreign Application Priority Data

Oct. 25, 1991 [JP] Japan .................. 3-279068
Sep. 7, 1992 [JP] Japan .................. 4-238441

[51] Int. Cl.$^5$ ............................. G06K 7/10
[52] U.S. Cl. .................. 235/467; 235/463; 235/470; 235/472
[58] Field of Search ............. 235/463, 470, 467, 472

[56] References Cited

U.S. PATENT DOCUMENTS

| | | | |
|---|---|---|---|
| 4,602,152 | 7/1986 | Dittakavi | 235/463 |
| 5,045,677 | 9/1991 | Okamura | 235/470 |
| 5,124,538 | 6/1992 | Lapinski | 235/463 |
| 5,194,722 | 3/1993 | Mergenthaler | 235/470 |

FOREIGN PATENT DOCUMENTS 63-85991 4/1988 Japan .

OTHER PUBLICATIONS

Publication entitled "A PDF 417 Tutorial", published by Symbol Technologies, Inc., Bohemia, New York, Oct., 1991, Title page, Table of Contents, pp. 1-54.
Publication entitled "Two-Dimensional Bar Codes-Monograph 6", published by Symbol Technologies, Inc., Bohemia, New York, 1990, Title page, Table of Contents and pp. 1-17, by Theo Pavlidis and Ynjiun P. Wang, Reprinted in IEEE 1990 from Proceedings of Industrial Automation Conference & Exhibition, Toronto, Jun. 19-21, 1990.
Paper entitled "Scan-Tech 90 Proceedings, Session 9A-High Density Siymbologies" given at International Auto, ID Show and Seminar—Georgia World Congress Center, Atlanta, Georgia, Oct. 2-4, 1990, sponsored by AIM USA, Pittsburgh, Pa., pp. 1.1-1.11, 2.1-2.9, 3.1-3.7.

Primary Examiner—Harold Pitts
Attorney, Agent, or Firm—Frishauf, Holtz, Goodman & Woodward

[57] ABSTRACT

The imaging result obtained by an imaging device for imaging light reflected by a bar code symbol and incident on it via a first mirror is decoded by a decoder and stored in a first symbol label memory. The bar code symbol label is again imaged by the imaging device via a second mirror, and the imaging result is decoded and stored in a second symbol label memory. A comparator compares the contents of the two symbol label memories and synthesizes them in accordance with the comparison result. The result of synthesis is stored in the first symbol label memory.

19 Claims, 11 Drawing Sheets

|  | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW 1 | 5 | 3 | 2 | 9 | 4 |  | 2 |  |
| ROW 2 | 1 | 2 |  | 7 | 8 | 4 |  | 7 |
| ROW 3 | 8 | 4 | 3 |  | 2 | 3 | 7 | 9 |
| ROW 4 | 1 | 3 | 4 | 5 | 8 |  | 3 | 2 |
| ROW 5 | 9 | 0 | 2 |  | 2 | 0 | 1 | 0 |
| ROW 6 | 2 | 5 |  | 0 | 8 | 2 | 5 | 2 |

FIG. 2B

|  | 1 | 2 | 3 | 4 | 5 | 6 | 7 | 8 |
|---|---|---|---|---|---|---|---|---|
| 1 | 5 | 3 |  |  | 4 | 5 | 2 | 9 |
| 2 | 1 | 2 | 1 | 7 |  | 4 | 0 | 7 |
| 3 | 8 | 4 | 3 | 0 | 2 |  | 7 | 9 |
| 4 | 1 | 3 |  | 5 | 8 | 0 | 3 | 2 |
| 5 |  | 0 | 2 | 9 | 2 |  | 1 | 0 |
| 6 | 2 | 5 | 1 | 0 | 8 | 2 |  | 2 |

FIG. 2C

|  | 1 | 2 | 3 | 4 | 5 | 6 | 7 | 8 |
|---|---|---|---|---|---|---|---|---|
| 1 | 5 | 3 | 2 | 9 | 4 | 5 | 2 | 9 |
| 2 | 1 | 2 | 1 | 7 | 8 | 4 | 0 | 7 |
| 3 | 8 | 4 | 3 | 0 | 2 | 3 | 7 | 9 |
| 4 | 1 | 3 | 4 | 5 | 8 | 0 | 3 | 2 |
| 5 | 9 | 0 | 2 | 9 | 2 | 0 | 1 | 0 |
| 6 | 2 | 5 | 4 | 0 | 8 | 2 | 5 | 2 |

BAR CODE SYMBOL READING APPARATUS

BACKGROUND OF THE INVENTION

1. Field of the Invention

The present invention generally relates to a bar code symbol reading apparatus for reading bar code symbols by using a two-dimensional imaging device and, more particularly, to a data processing method for use in such an apparatus.

2. Description of the Related Art

Recently, bar code symbols are used in many countries. In Japan, for instance, bar code symbols are printed on about 99% of foodstuffs and daily necessaries, and the industries using bar code symbols have increased in number because of convenience, a high reading speed, and correctness of bar code symbols.

A number of types of bar code symbols themselves have been proposed. Representative examples of bar code symbols are a JAN/UPC/EAN code, an ITF (Interleaved 2 of 5) code, CODE39, an NW-7 code, and CODE128. In addition, two-dimensional bar code symbols having large information amounts and high recording densities are beginning to be proposed in recent years to meet demands for more information in a narrower space. Examples of the two-dimensional bar code symbols are CODE16K, CODE49, PDF417, and DATA CODE.

In contrast to these two-dimensional bar code symbols, the JAN/UPC/EAN code, the ITF code, the CODE39, the NW-7 code, and the CODE128 described above are often called one-dimensional bar code symbols.

Many types of apparatuses are available as an apparatus for reading the one-dimensional bar code symbols, such as the JAN/UPC/EAN code, the ITF code, the CODE39, the NW-7 code, and the CODE128. Representative types are a pen type, a touch type, and a laser type. However, methods of reading bar code symbols are almost the same. That is, light radiated from a light source onto a bar code symbol is reflected by the bar code symbol and focused by a light-receiving device incorporated in a reading apparatus. This focused signal is decoded by an electric circuit constituted by a microcomputer or the like.

The number of types of apparatuses, on the other hand, for reading the two-dimensional bar code symbols, such as the CODE16K, the CODE49, the PDF417, and the DATA CODE described above, is small. Therefore, a method of reading these two-dimensional bar code symbols has not been established yet. It is considered that the following two methods are currently general as a method of reading the two-dimensional bar code symbols. One is a method in which a bar code symbol is imaged by a two-dimensional imaging device and stored in an image memory (frame memory), and the contents of the stored bar code symbol image are decoded; the other is a method of decoding the contents of a bar code symbol by two-dimensionally scanning a semiconductor laser.

Figure 6A:
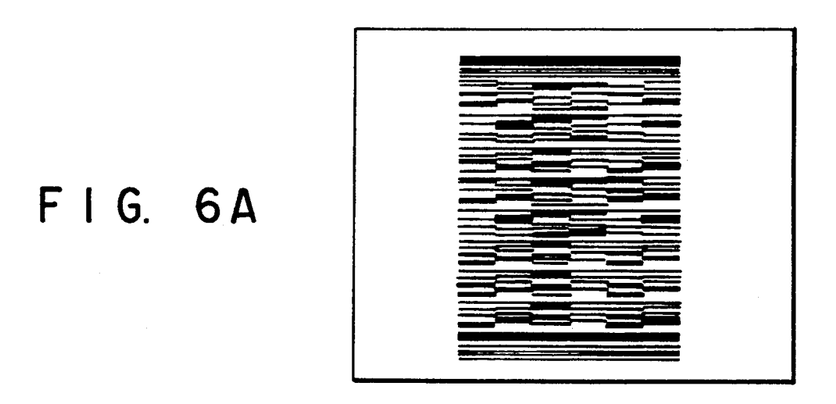
FIG. 6A is a view showing the contents of a frame memory shown in FIG. 4 when a bar code symbol label is read at an angle rotated through 90× from an ordinary direction in the fourth embodiment.
Figure 6B:
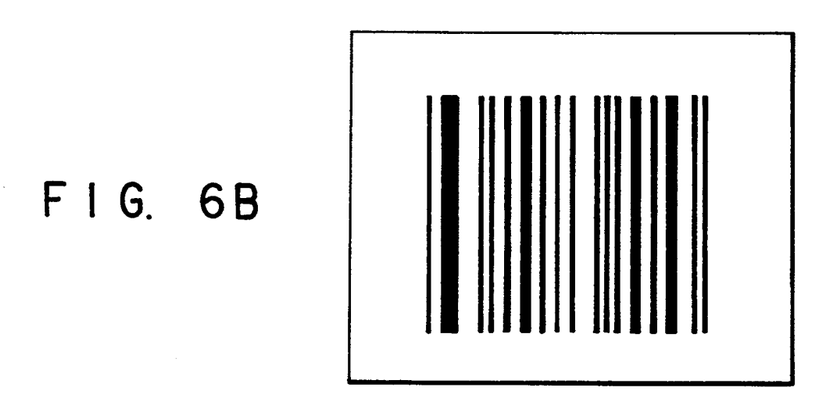
FIG. 6B is a view showing the contents of the frame memory when a one-dimensional bar code symbol is read.

FIG. 6B shows the contents of an image memory (frame memory) after a general one-dimensional bar code symbol, such as the JAN/UPC/EAN code, the ITF code, the CODE39, the NW-7 code, or the CODE128, is imaged by a two-dimensional imaging device.

Figure 6C:
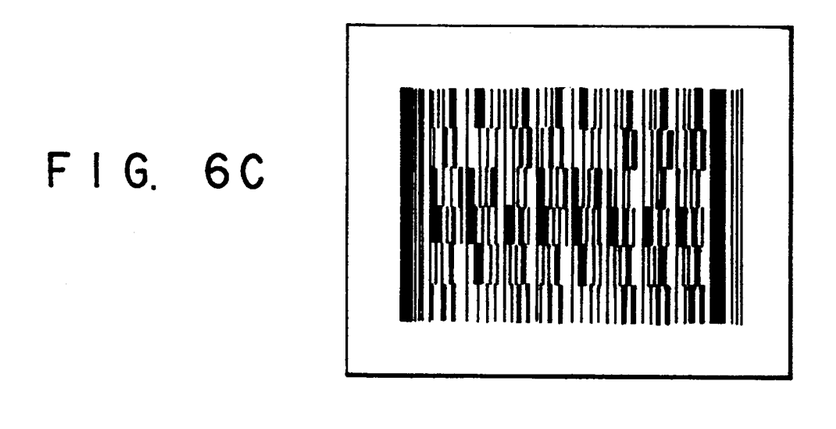
FIG. 6C is a view showing the contents of the frame memory when a two-dimensional bar code symbol is read in an ordinary direction.

FIG. 6C shows the contents of an image memory (frame memory) after a two-dimensional bar code symbol, such as the CODE16K, the CODE49, the PDF417, or the DATA CODE, is imaged by a two-dimensional imaging device.

As is apparent from a comparison between FIGS. 6B and 6C, the shape of the two-dimensional bar code symbol is more complicated than that of the one-dimensional bar code symbol. In general, the recording density of the two-dimensional bar code symbol is 10 times or more that of the one-dimensional bar code symbol, and the recording capacity of the former is about 100 times that of the latter. The number of pixels of an image memory (frame memory) corresponding to a bar or space having a minimum width after a bar code symbol is imaged by a two-dimensional imaging device in the case of the two-dimensional bar code symbol is 1/10 times or less that in the case of the one-dimensional bar code symbol.

This big difference makes it very difficult to establish a two-dimensional bar code symbol reading technique compared to a one-dimensional bar code symbol reading technique. For example, whether or not two-dimensional bar code symbols can be read correctly depends on a slight error, such as an error in an angle at which a two-dimensional imaging device is mounted with respect to a two-dimensional bar code symbol (an error in a so-called read angle), an error in a height at which a two-dimensional imaging device is mounted with respect to a two-dimensional bar code symbol (an error in a so-called focusing state in reading), or an error in lighting conditions.

These errors, however, are not taken into account at all in conventional two-dimensional bar code symbol reading apparatuses.

SUMMARY OF THE INVENTION

The present invention has been made in consideration of the above situation and has as its object to provide a bar code symbol reading apparatus capable of correctly reading bar code symbols, particularly two-dimensional bar code symbols.

According to the present invention, there is provided a bar code symbol reading apparatus comprising imaging means for imaging a bar code symbol at least twice, decoding means for decoding each of the bar code symbol imaging results from the imaging means, at least two storage means each for storing the decoding result from the decoding means obtained by decoding one of the imaging results from the imaging means, and synthesizing means for synthesizing the stored contents of the at least two storage means.

That is, in the bar code symbol reading apparatus according to the present invention, imaging is performed twice or more to read a bar code symbol. The first imaging result is decoded and stored in one storage means, and the result of decoding of the second imaging is stored in the other storage means. The stored contents of these storage means are synthesized by the synthesizing means, thereby correctly reading the contents of the bar code symbol.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2C are views for explaining the operation of a comparator shown in FIG. 1, in which

DETAILED DESCRIPTION OF THE PREFERRED EMBODIMENTS

The embodiments of the present invention will be described below with reference to the accompanying drawings.

1st Embodiment

Figure 1:
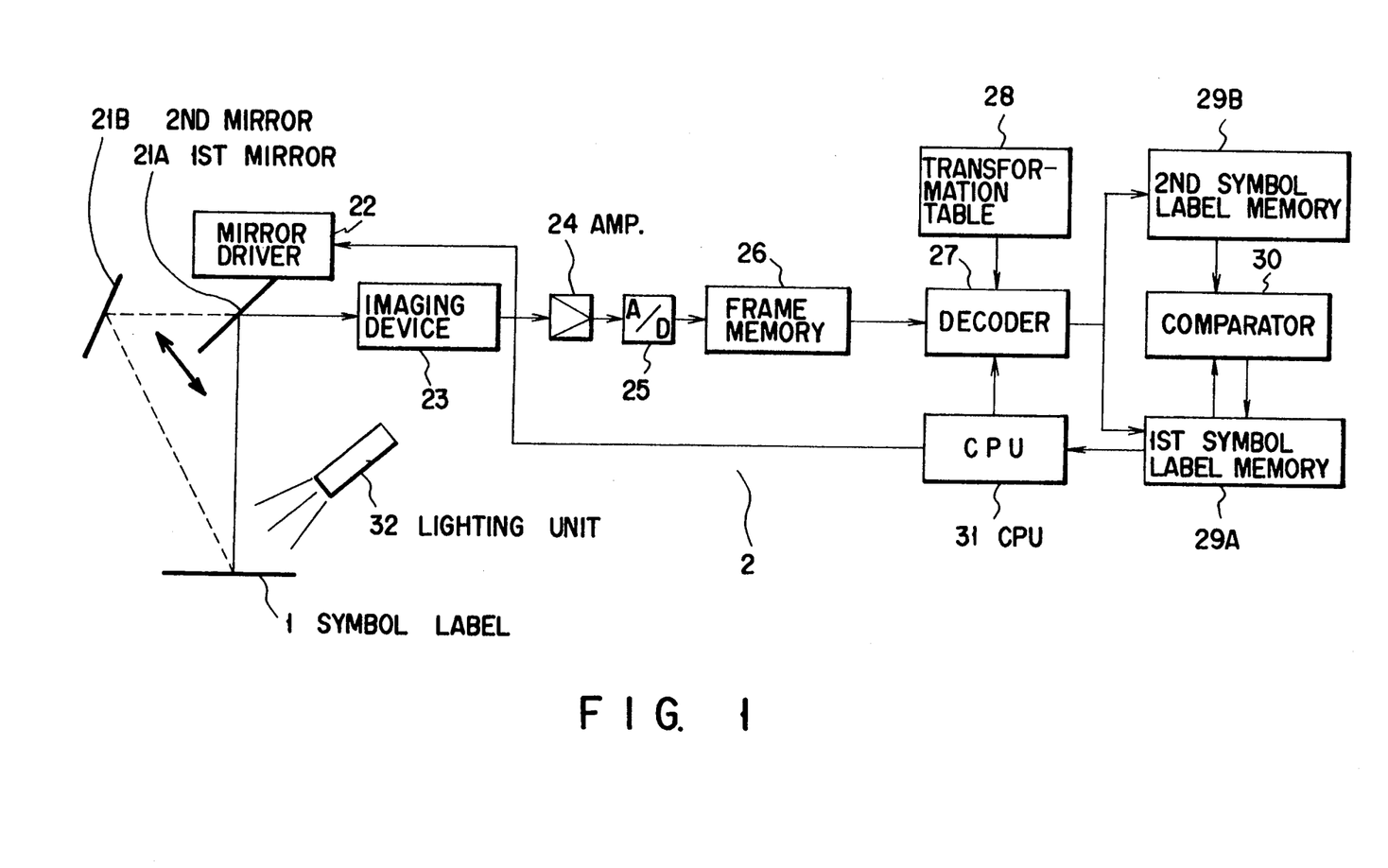
FIG. 1 is a block diagram showing the first embodiment of a bar code reading apparatus according to the present invention.

FIG. 1 is a block diagram showing the arrangement of the first embodiment of the present invention. A bar code symbol reading apparatus 2 according to this embodiment for reading a two-dimensional bar code symbol label 1 comprises first and second mirrors 21A and 21B; a mirror driver 22 for pulling up the first mirror 21A; an imaging device 23 for acquiring an image of the bar code symbol label 1; an amplifier 24; an analog/digital (A/D) converter 25; a frame memory 26; a decoder 27; a transformation table 28; first and second symbol label memories 29A and 29B for storing the decoding results; a comparator 30 for comparing and synthesizing the contents of these two symbol label memories 29A and 29B; a CPU 31 for controlling the overall system; and a lighting unit 32 for lighting up the bar code symbol label 1.

The operation of the bar code symbol reading apparatus 2 having the above arrangement will be described in detail below.

The bar code symbol label 1 is lighted up by the lighting unit 32, and the light reflected by the label 1 is incident on the imaging device 23 via the first mirror 21A of the two mirrors. The optical signal is converted into a weak electrical signal by the imaging device 23, and this weak electrical signal is amplified by the amplifier 24. This amplified electrical signal is converted into digital values from "0" to "255" by the A/D converter 25 and stored in the frame memory 26.

The contents of the frame memory 26 are decoded by the decoder 27 by reference to the transformation table 28. That is, the decoder 27 fetches from the transformation table 28 a value corresponding to the pattern of combination of bars and spaces read out from the frame memory 26. The decoding result is stored in the first symbol label memory 29A of the two symbol label memories.

Subsequently, the mirror driver 22 pulls up the first mirror 21A in accordance with an instruction from the CPU 31. As a result, the light reflected by the bar code symbol label 1 is incident on the imaging device 23 via the second mirror 21B through a path indicated by a dotted line in FIG. 1. That is, the light incident on the imaging device 23 this time is obtained by imaging the bar code symbol label 1 at a different angle from that at the first time. Thereafter, the decoding is performed in the same manner as described above. The decoding result, however, is stored this time in the second symbol label memory 29B of the two symbol label memories.

The comparator 30 compares and synthesizes the contents of the two symbol label memories 29A and 29B and returns the result of synthesis to the first symbol label memory 29A. The CPU 31 fetches the contents of the first symbol label memory 29A as the synthesis result and transfers them to a store computer (not shown).

The operation of the comparator 30 will now be described in more detail below with reference to FIGS. 2A to 2C.

Figure 2A:
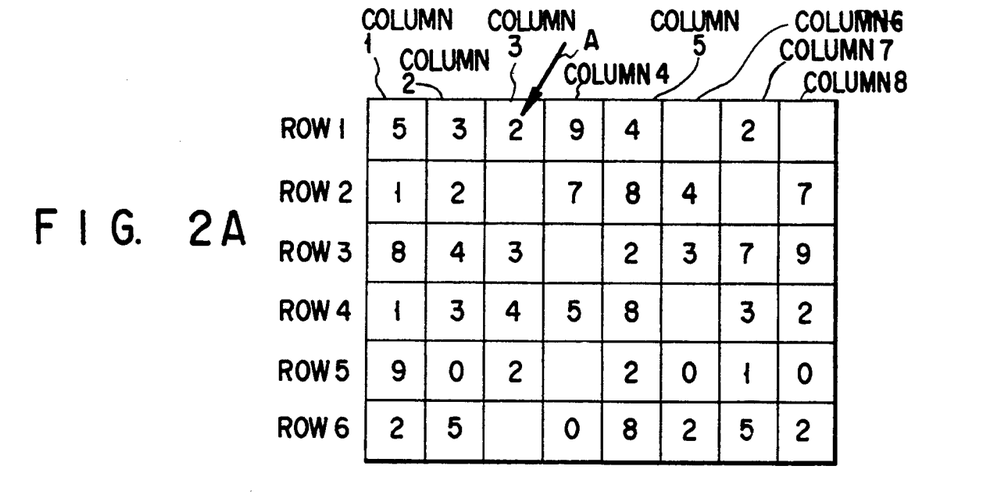
FIG. 2A illustrates the stored contents of one of two symbol label memories shown in FIG. 1.
Figure 2B:
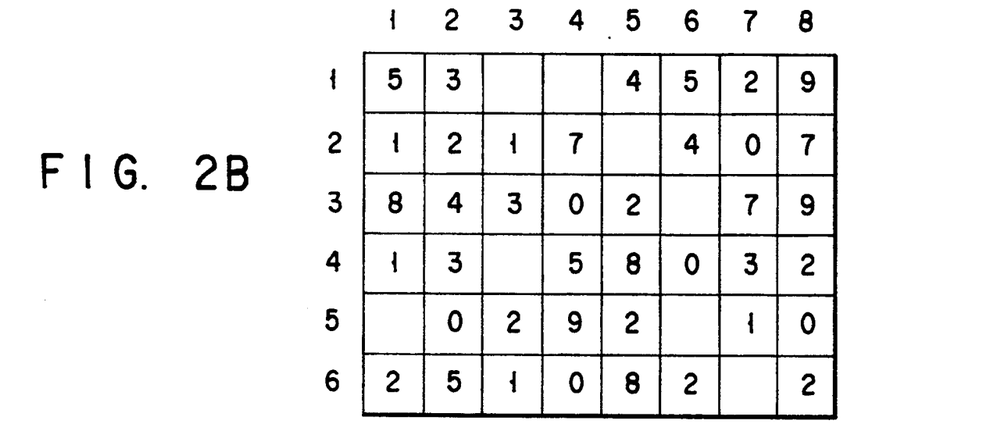
FIG. 2B illustrates the stored contents of the other one of the two symbol label memories shown in FIG. 1.
Figure 2C:
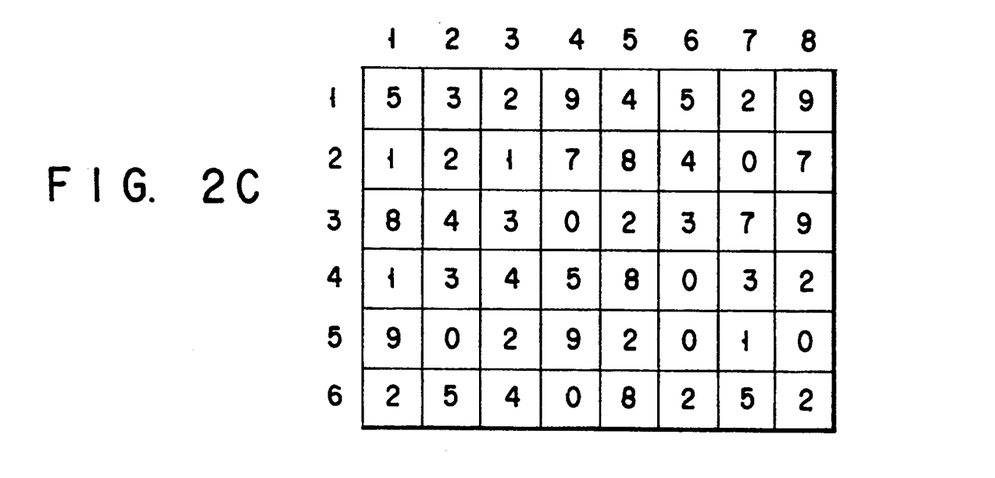
FIG. 2C illustrates the result of comparison and synthesis of the stored contents of the two symbol label memories shown in FIG. 1.

FIG. 2A shows the contents of the first symbol label memory 29A storing the decoding result of the decoder 27 when the light reflected by the bar code symbol label 1 is imaged via the first mirror 21A, and FIG. 2B shows the contents of the symbol label memory 29B storing the decoding result of the decoder 27 when the light reflected by the bar code symbol label 1 is imaged via the second mirror 21B. Each drawing illustrates an example in which the two-dimensional symbol label 1 has a structure of 6 rows×8 columns. Assume that a position (indicated by an arrow A in FIG. 2A) in the third column on the first row, for example, will be represented by (1,3) hereinafter.

In the first symbol label memory 29A shown in FIG. 2A, the values of positions (1,6), (1,8), (2,3), (2,7), (3,4), (4,6), (5,4), and (6,3) are not determined yet (blanked).

In the second symbol label memory 29B shown in FIG. 2B, the values of positions (1,3), (1,4), (2,5), (3,6), (4,3), (5,1), (5,6), and (6,7) remain undetermined. Note that these positions having no determined values appear when a value corresponding to the pattern of combination of bars and spaces read out from the frame memory 26 is not present in the transformation table 28.

The comparator 30 sequentially compares the contents of the two symbol label memories 29A and 29B and synthesizes them such that if a position having no determined value is present in one memory, the content of the other memory is adopted. The comparator 30 in this manner eliminates portions having no determined values and stores the synthesis result in the first symbol label memory 29A. The result is shown in FIG. 2C.

If the contents of the two symbol label memories 29A and 29B are different from each other or a position having a determined value in neither memories is present, the bar code symbol label is imaged again by the imaging device 23. When the two-dimensional bar code symbol label 1 has the ability to correct errors, the contents of the two-dimensional bar code symbol label 1 can be restored by error correction even if a value remains undetermined within the range of error correcting ability.

Note, in this embodiment, that the imaging device 23 is controlled to image the bar code symbol label 1 twice at different angles. However, the contents of the two-dimensional bar code symbol label 1 can be similarly restored by imaging it three times or more at different angles.

In addition, the imaging device 23 is controlled to image the bar code symbol label 1 twice at different angles by pulling up the first mirror 21A. The contents of the two-dimensional bar code symbol label 1, however, can be similarly restored by using two or more imaging devices arranged at different angles with respect to the bar code symbol label 1.

As described above, the bar code symbol label 1 is imaged a plurality of number of times, and pieces of image information stored in the frame memory 26 in the respective imaging operations are decoded by the decoder 27 and stored in the different symbol label memories 29A and 29B. The contents of the two memories 29A and 29B are sequentially compared and synthesized by the comparator 30, and the synthesis result is stored in one symbol label memory 29A. Therefore, the bar code symbol can be read reliably and correctly.

In addition, the bar code symbol label 1 is imaged a plurality of number of times while the imaging conditions are changed. Thus, the number of portions having determined values in neither of the symbol label memories 29A and 29B can be minimized.

Several other methods are possible as a method of minimizing the number of portions having determined values in neither of the symbol label memories 29A and 29B. These methods will be described below as the other embodiments of the present invention.

2nd Embodiment

Figure 3:
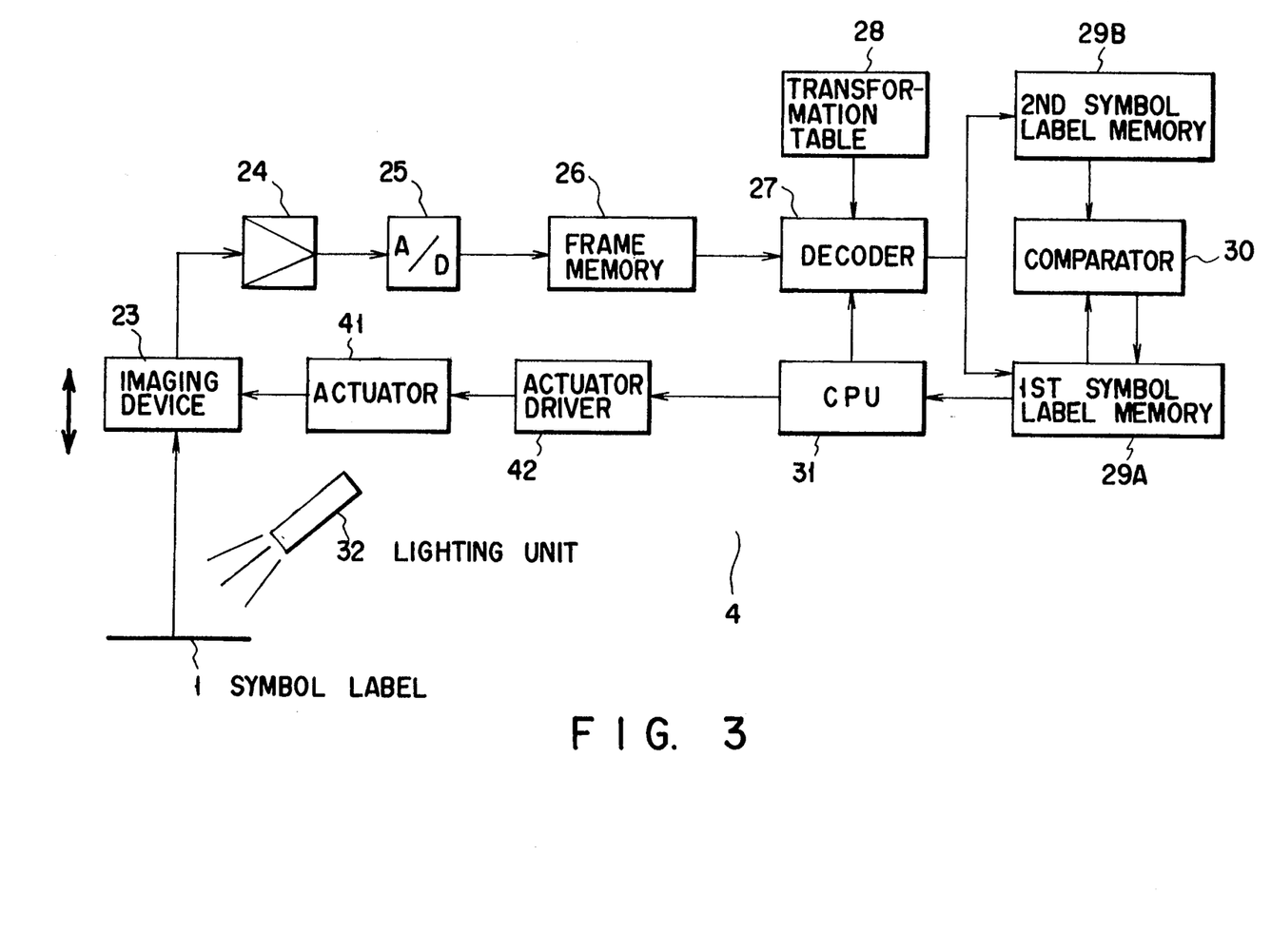
FIG. 3 is a block diagram showing the second embodiment of a bar code reading apparatus according to the present invention.

FIG. 3 is a block diagram showing the arrangement of the second embodiment of the present invention. In FIG. 3, the same reference numerals as in FIG. 1 denote the same parts, and a detailed description thereof will be omitted.

A bar code symbol reading apparatus 4 according to this embodiment comprises, in place of the mirrors 21A and 21B and the mirror driver 22 shown in FIG. 1, an actuator 41 nor moving an imaging device 23 vertically (in the up-and-down direction of the drawing), and an actuator driver (imaging device vertical driver) 42 for driving the actuator 41.

That is, in this embodiment, the distance between the imaging device 23 and a bar code symbol label 1 is changed by driving the actuator 41 under the control of the imaging device vertical driver 42, thereby imaging the bar code symbol label 1 at two different distances. The decoding results of these images are stored in two symbol label memories 29A and 29B and synthesized.

Note that the imaging device 23 may be controlled to image the bar code symbol label 1 three times or more from three or more positions at different heights or that two or more imaging devices may be arranged at positions at different heights instead of moving the imaging device 23. Alternatively, the arrangement may be modified such that two or more imaging devices are located at the same height while a lens having a variable magnification is provided between the imaging devices and the bar code symbol label 1. Furthermore, the lens characteristics not only the magnification but also the focal length may be changed.

3rd Embodiment

Figure 4:
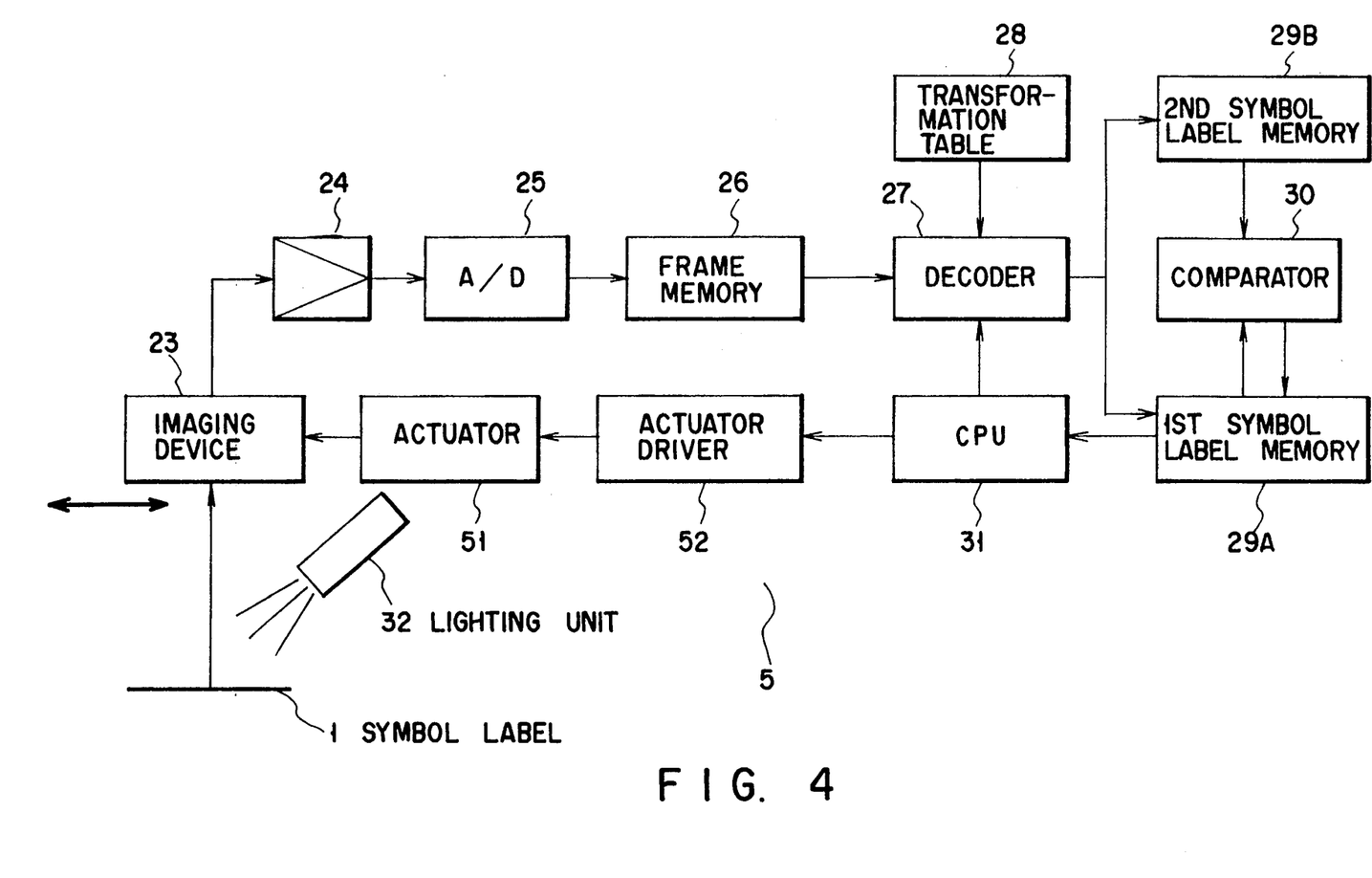
FIG. 4 is a block diagram showing the third embodiment of a bar code reading apparatus according to the present invention.

FIG. 4 is a block diagram showing the arrangement of the third embodiment of the present invention, in which the same reference numerals as in FIG. 3 denote the same parts.

A bar code symbol reading apparatus 5 according to this embodiment comprises, in place of the actuator 41 and the imaging device vertical driver 42 for moving the imaging device 23 vertically shown in FIG. 3, an actuator 51 for moving the imaging device 23 horizontally (in the right-and-left direction on the drawing surface of FIG. 4), and an actuator driver (imaging device horizontal driver) 52 for driving the actuator 51.

That is, in this embodiment, the imaging device 23 is moved horizontally with respect to a bar code symbol label 1 by driving the actuator 51 under the control of the imaging device horizontal driver 52, thereby imaging the bar code symbol label 1 from two different positions. The decoding results of these images are stored in two symbol label memories 29A and 29B and synthesized.

In this case, the amount of horizontal movement of the imaging device 23 with respect to the bar code symbol label 1 need only be about one pixel of the imaging device 23, so a piezomotor or the like can be used as the actuator 51.

Note that the imaging device 23 may be moved horizontally in the direction of depth of the drawing paper (direction from the upper to the lower surface of the drawing paper). Alternatively, the imaging device 23 may be optically moved horizontally with respect to the bar code symbol label 1 by interposing a prism between the imaging device 23 and the bar code symbol label 1 or by rotating the interposed prism.

4th Embodiment

Figure 5:
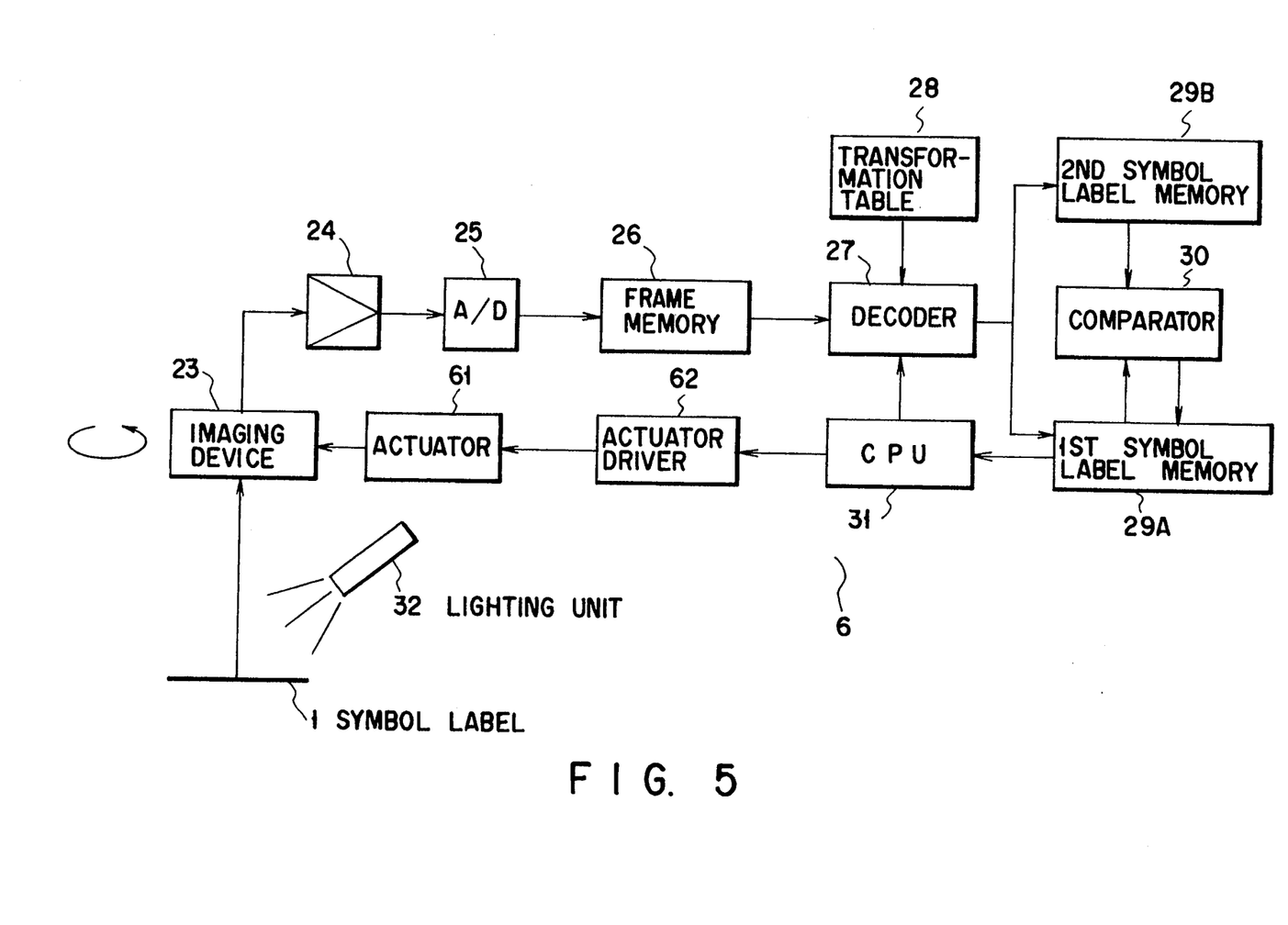
FIG. 5 is a block diagram showing the fourth embodiment of a bar code reading apparatus according to the present invention.

FIG. 5 is a block diagram showing the arrangement of the fourth embodiment of the present invention, in which the same reference numerals as in FIG. 3 denote the same parts.

A bar code symbol reading apparatus 6 according to this embodiment comprises, in place of the actuator 41 and the imaging device vertical driver 42 for moving the imaging device 23 vertically shown in FIG. 3, an actuator 61 for rotating the imaging device 23 and an actuator driver (imaging device rotational driver) 62 for driving the actuator 61.

The imaging device 23 is rotated with respect to a bar code symbol label 1 by driving the actuator 61 under the control of the imaging device rotating driver 62, thereby imaging the bar code symbol label 1 at two different angles. The results of decoding of these images are stored in two symbol label memories 29A and 29B and synthesized.

Note that the imaging device 23 may be controlled to image the bar code symbol label 1 three times or more at three or more different angles or that imaging devices may be arranged at two or more positions at different angles instead of rotating the imaging device 23. That is, as shown in FIG. 6A, the arrangement may be modified such that the bar code symbol label 1 is read at an angle rotated through 90° with respect to an ordinary direction (FIG. 6C).

5th Embodiment

Figure 7:
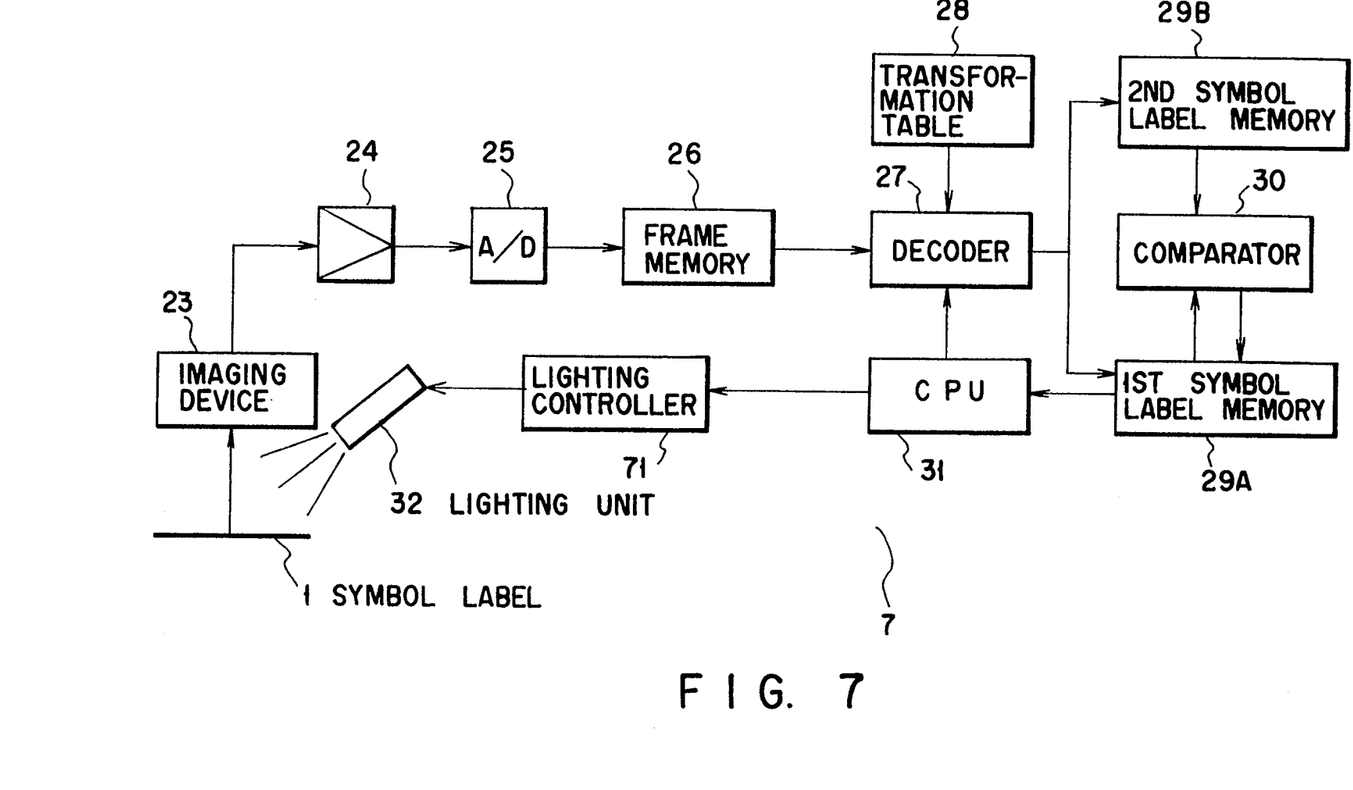
FIG. 7 is a block diagram showing the fifth embodiment of a bar code reading apparatus according to the present invention.

FIG. 7 is a block diagram showing the arrangement of the fifth embodiment of the present invention, in which the same reference numerals as in FIG. 1 denote the same parts.

A bar code symbol reading apparatus 7 according to this embodiment comprises, in place of the mirrors 21A and 22B and the mirror driver 22 shown in FIG. 1, a lighting controller 71 for changing the luminous energy by controlling a lighting unit 32.

That is, in this embodiment, the luminous energy by which a bar code symbol label 1 is lighted up is changed under the control of the lighting controller 71, thereby imaging the bar code symbol label 1 by two different luminous energies. The results of decoding of these images are stored in two symbol label memories 29A and 29B and synthesized.

Note that three or more luminous energies by which the bar code symbol label 1 is lighted up may be set to image the bar code symbol label 1 three times or more. Alternatively, imaging may be performed by changing the wavelength of light for lighting up the bar code symbol label 1, instead of changing the luminous energy by which the bar code symbol label 1 is lighted up. In addition, the same effect as obtained by changing the luminous energy can be obtained by arranging imaging devices at two or more positions at different heights.

Furthermore, the arrangement can be modified, without using the lighting controller 71, such that a shutter is interposed between the imaging device 23 and the bar code symbol label 1 and two or more closing times of the shutter are set to change the amount of the light input to the imaging device 23. The arrangement can also be modified such that a diaphragm mechanism is arranged between the imaging device 23 and the bar code symbol label 1 and two or more diaphragm positions are set, thereby changing the input light amount to the imaging device 23 by changing the diaphragm position. Alternatively, a filter may be provided between the imaging device 23 and the bar code symbol label 1 and rotated or replaced with another filter. Also, without using the lighting controller 71, the lighting unit 32 may be moved horizontally to change the radiation angle of light for lighting up the bar code symbol label 1. If an LED lighting unit is used as the lighting unit 32, it is possible to change the light amount by which the bar code symbol label 1 is lighted up by changing the number of LEDs to be turned on. The same effect can be obtained by preparing LEDs of a plurality colors in the LED lighting unit and changing the color of LEDs to be turned on. Furthermore, a plurality of types of lighting units, such as an LED lighting unit and a halogen lamp lighting unit, can be selectively used as the lighting unit 32.

6th Embodiment

Figure 8:
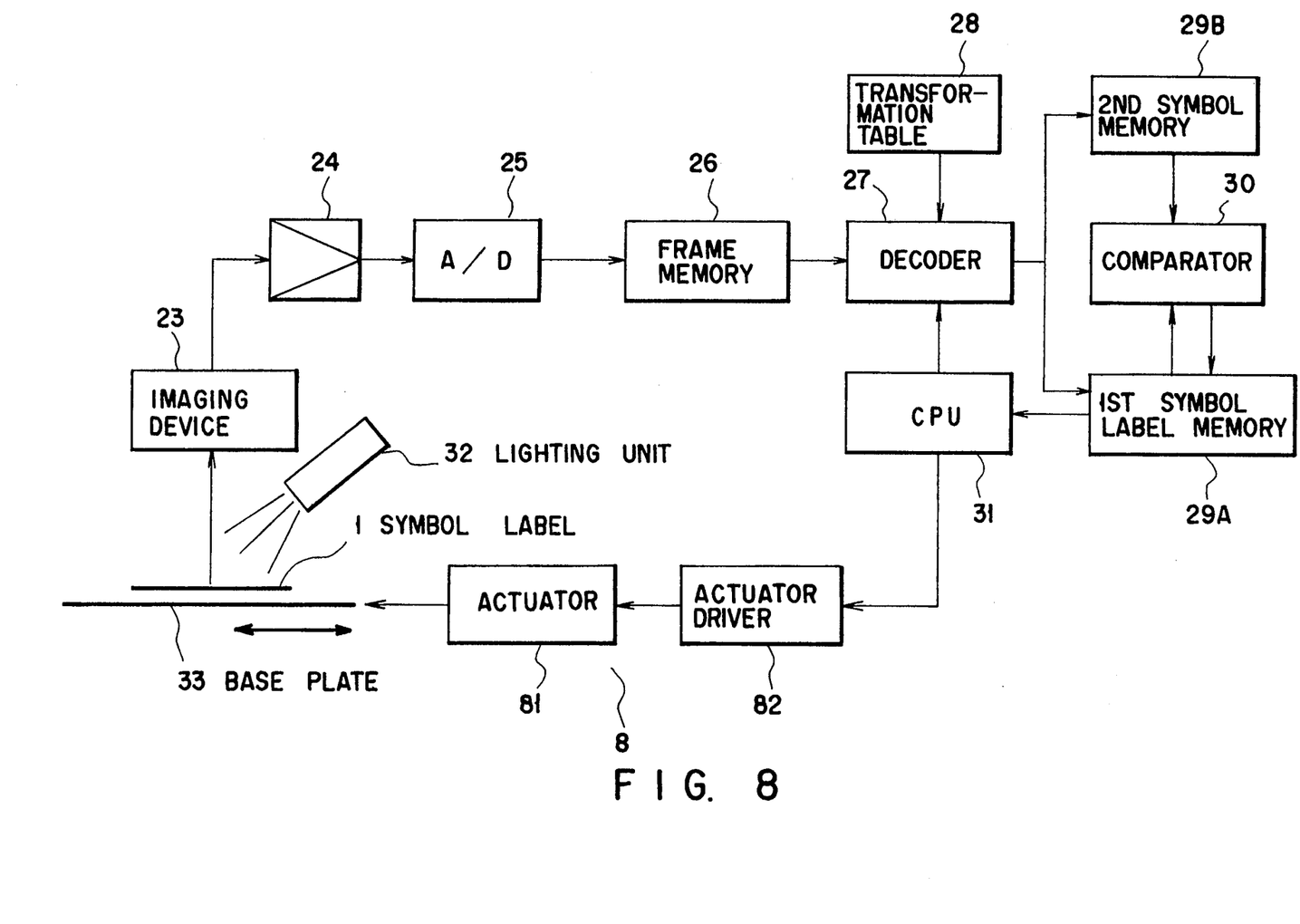
FIG. 8 is a block diagram showing the sixth embodiment of a bar code reading apparatus according to the present invention.

FIG. 8 is a block diagram showing the sixth embodiment of the present invention, in which the same reference numerals as in FIG. 1 denote the same parts.

A bar code symbol reading apparatus 8 according to this embodiment comprises, in place of the mirrors 21A and 22B and the mirror driver 22 shown in FIG. 1, a base plate 33 on which a bar code symbol label 1 is placed, an actuator 81 for horizontally moving the base plate 33 on which the bar code symbol label 1 is placed, and an actuator driver 82 for driving the actuator 81.

The actuator 81 is driven under the control of the actuator driver 82 to move the base plate 33 so that the bar code symbol label 1 is moved horizontally (in the right-and-left direction on the drawing surface of FIG. 8) with respect to the imaging device 23, thereby imaging the bar code symbol label 1 at two different positions. The results of decoding of these two images are stored in two symbol label memories 29A and 29B and synthesized to restore the contents of the bar code symbol label 1.

Note that the base plate 33 may be moved to move the bar code symbol label 1 horizontally in the direction of depth of the drawing paper (direction from the upper to the lower surface of the drawing paper). Alternatively, the actuator 81 may be driven under the control of the actuator driver 82 to tilt the base plate 33, i.e., to tilt the bar code symbol label 1 with respect to the imaging device 23. In this case, two or more tilt angles are set, and the bar code symbol label 1 is imaged at each tilt angle.

7th Embodiment

The seventh embodiment of the present invention has the same arrangement as shown in FIG. 8. In this embodiment, however, the right half portion of a bar code symbol label 1 is stored in a frame memory 26 and decoded first, and the decoding result is stored in a first symbol label memory 29A. Immediately after the storage or when a predetermined time elapses after the storage, a base plate 33 is moved horizontally to the right, and the left half portion of the bar code symbol label 1 is stored in the frame memory 26 and decoded. After the decoding result is stored in a second symbol label memory 29B, the contents of these two symbol label memories 29A and 29B are synthesized to restore the contents of the two-dimensional bar code symbol label 1.

A method of synthesizing the contents of the two symbol label memories 29A and 29B will be described below.

Suppose, for example, that the left and right half portions of a JAN/UPC/EAN code as a one-dimensional bar code symbol are stored in sequence in the frame memory 26. In this case, since the code system of the left half is different from that of the right half, it is possible to determine which contents of the two symbol label memories 29A and 29B represent the left (or right) half portion. When the upper and lower half portions are sequentially stored in the frame memory 26, particularly no problem arises because, of course, even the upper or lower half portion alone can be correctly decoded.

Figure 9:
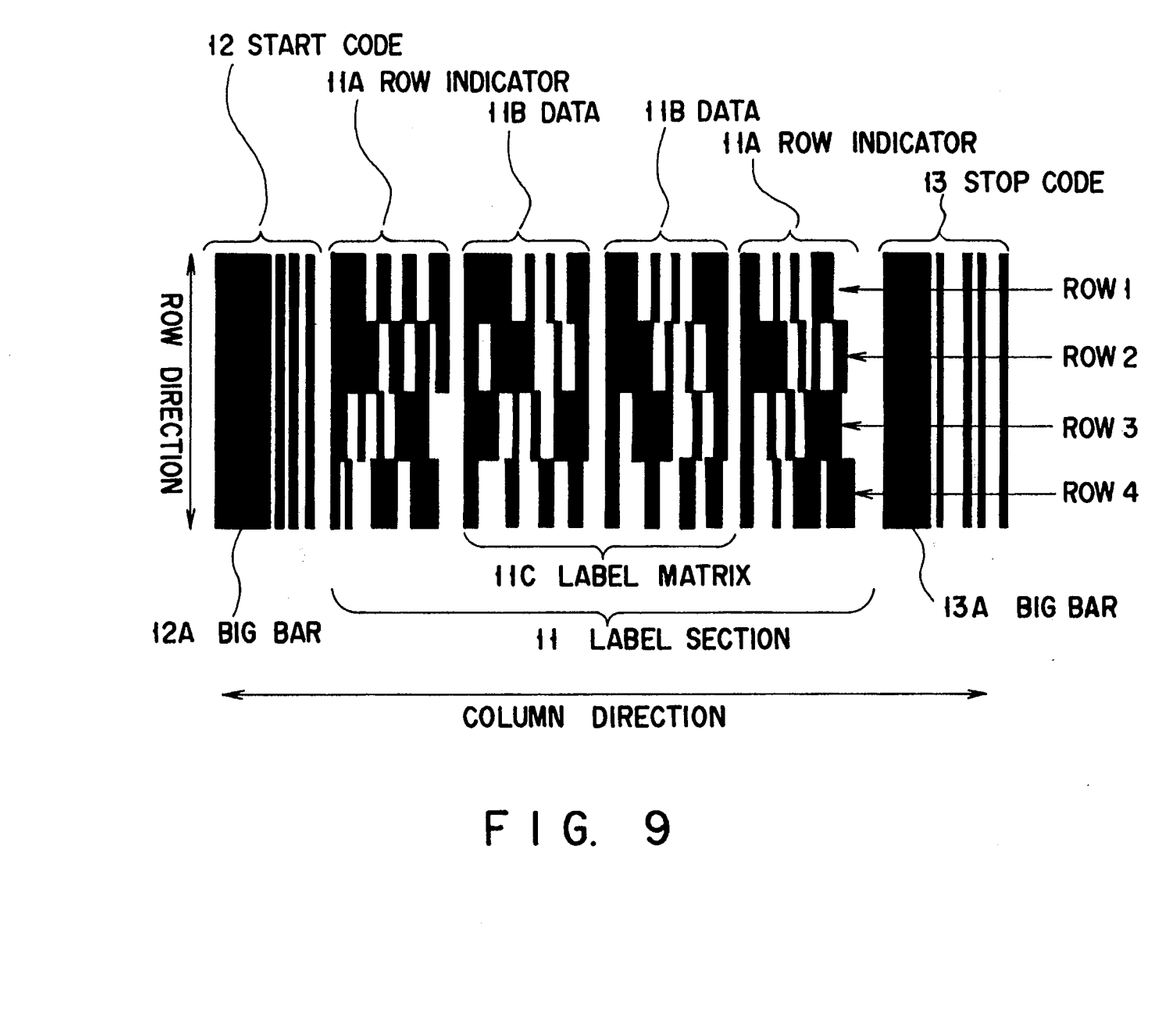
FIG. 9 is a view showing the label structure of a PDF417 bar code symbol as a two-dimensional bar code symbol.

A case wherein a PDF417 bar code symbol as a two-dimensional bar code symbol is used will be described below. FIG. 9 shows the label structure of PDF417 having a 4×2 label matrix. This bar code symbol label 1 has a label section 11 as an area of information components to be restored, which is constituted by bar code characters each consisting of a combination of bars and spaces, and start and stop codes 12 and 13 as start and stop characters arranged before and after the label section 11. Each code is constituted by four bars and four spaces except for the stop code 13 which is constituted by five bars and four spaces. The start and stop codes 12 and 13 begin with wide bars 12A and 13A called "big bars".

The label section 11 has codes called row indicators 11A located adjacent to the start and stop codes 12 and 13 and a label matrix 11C sandwiched between the row indicators 11A and containing a plurality of data columns 11B in which actual data is written. In each row indicator 11A, pieces of information such as the size of the label in the row and column directions, the security level, and the number of each row are written. The security level means the level of the ability to correct errors that the PDF417 has. The PDF417 has nine security levels. Therefore, the information size and the like of a bar code symbol can be determined by decoding the information of the row indicator. More specifically, if the information of the row indicator is decoded, the data columns 11B can be decoded in sequence to the right or left from the row indicator 11A. That is, it is possible to determine the number of the row and that of the column at which given data of the data column 11B is located. Therefore, decoding can be correctly performed even if the right and left half portions or the upper and lower half portions of a bar code symbol are sequentially stored in the frame memory 26.

Note that the arrangement may be modified such that the imaging device 23 is moved instead of moving the bar code symbol label 1 and the region to be lighted up by the lighting unit 32 is controlled.

This seventh embodiment is effective particularly for a bar code symbol label 1 which is too large to be stored in the frame memory 26 if imaging is performed only once.

8th Embodiment

Figure 10:
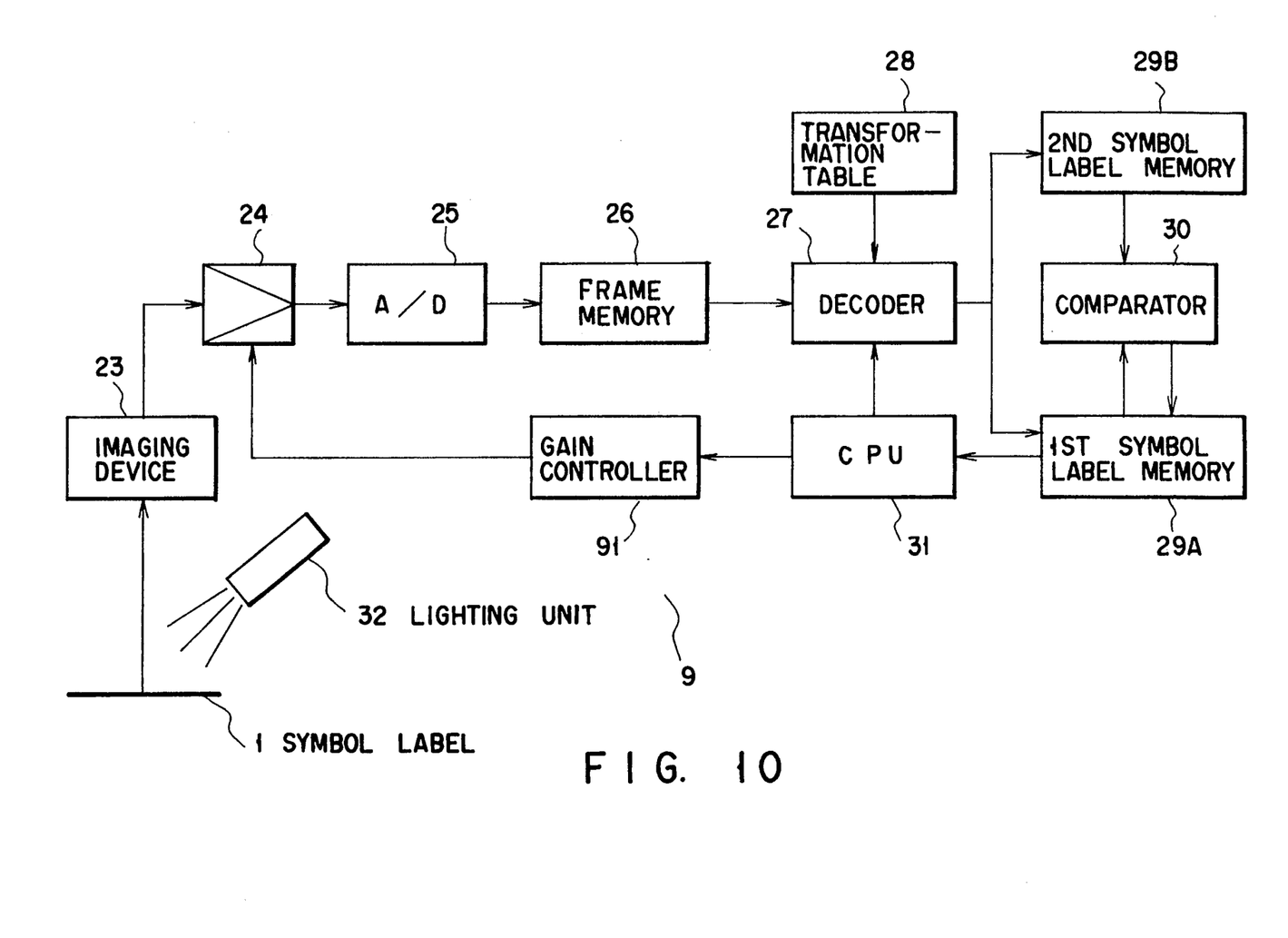
FIG. 10 is a block diagram showing the eighth embodiment of a bar code reading apparatus according to the present invention.

FIG. 10 is a block diagram showing the arrangement of the eighth embodiment of the present invention, in which the same reference numerals as in FIG. 1 denote the same parts.

A bar code symbol reading apparatus 9 according to this embodiment comprises, in place of the mirrors 21A and 21B and the mirror driver 22 shown in FIG. 1, a gain controller 91 for adjusting the amplification gain of an amplifier 24.

In this embodiment, two or more amplification gains at which an output weak electrical signal from an imaging device 23 is amplified can be set by the gain controller 91, and the electrical signal of an imaged bar code symbol label 1 is amplified sequentially at these two different amplification gains and stored in a frame memory 26. That is, the electrical signal is first amplified at the first amplification gain and stored in the frame memory 26, and the result of decoding of the stored contents is stored in a first symbol label memory 29A. Subsequently, the electrical signal is amplified by the second amplification gain and stored in the frame memory 26, and the result of decoding of the stored contents is stored in a second symbol label memory 29B. The contents of the two-dimensional bar code symbol label 1 are restored by synthesizing these two decoding results.

Note that the amplification gain need not be changed but image processing, such as edge correction, may be performed for the electrical signal amplified by the amplifier 24. That is, the result subjected to the image processing and that not subjected to the processing may be synthesized. Alternatively, a look-up table may be inserted between an A/D converter 25 and the frame memory 26 so that the storage of the amplified signal into the frame memory 26 can be performed while the value of the look-up table is changed. In addition, the input timing to the A/D converter 25 may be delayed by using a delay line or the like. Also, the frequency of a clock signal to be applied to the A/D converter 25 may be changed. In this case, since different states of the bar code symbol label 1 can be stored in the frame memory 26 when the frequency is changed, the contents of the two-dimensional bar code symbol label 1 can be restored by synthesizing these different states.

As described above, the electrical processing to be performed before the electrical signal is stored in the frame memory 26 may be changed.

9th Embodiment

Figure 11:
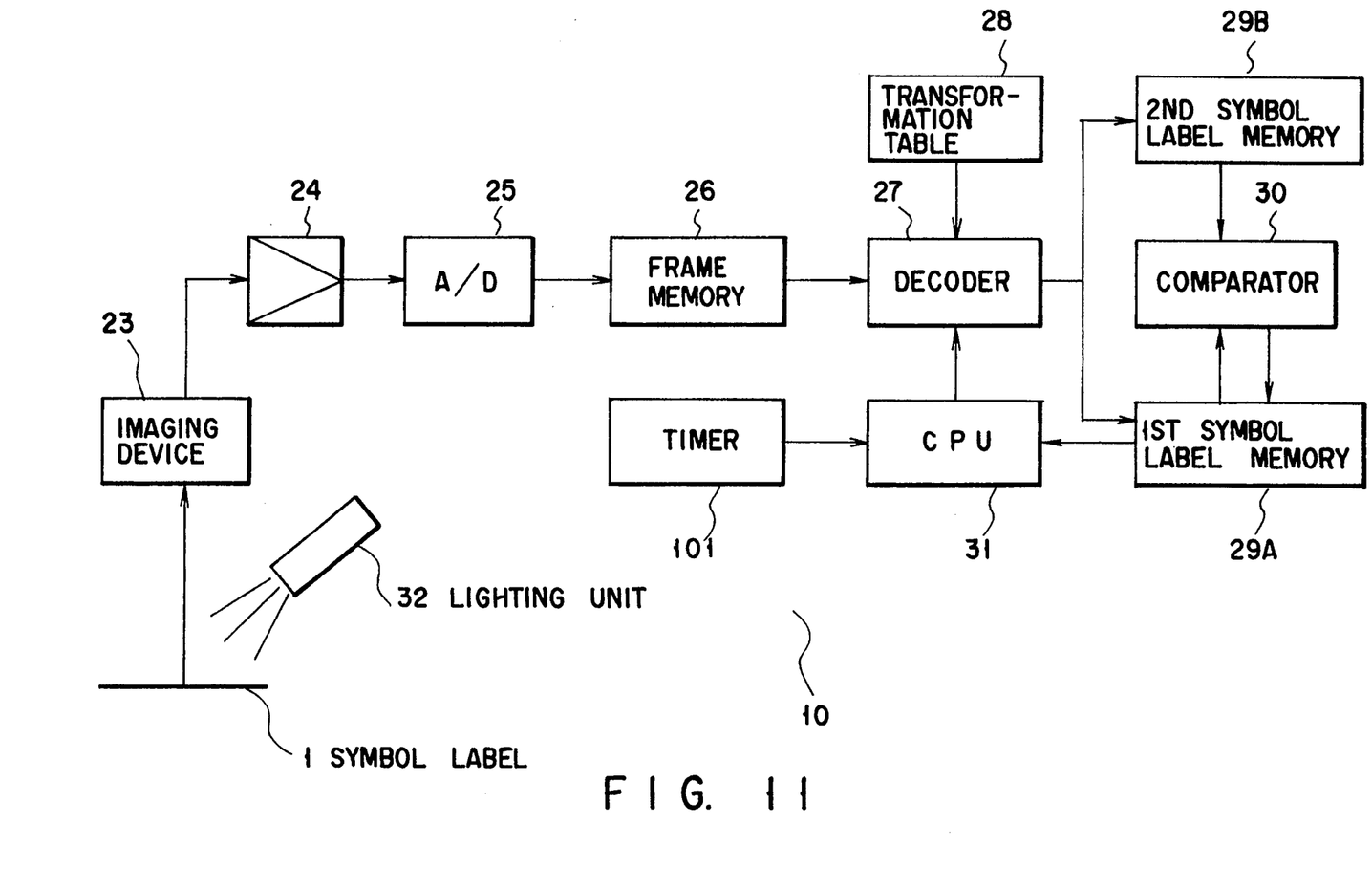
FIG. 11 is a block diagram showing the ninth embodiment of a bar code reading apparatus according to the present invention.

FIG. 11 is a block diagram showing the arrangement of the ninth embodiment of the present invention, in which the same reference numerals as in FIG. 1 denote the same parts.

A bar code symbol reading apparatus 10 according to this embodiment comprises, in place of the mirrors 21A and 21B and the mirror driver 22 shown in FIG. 1, a timer circuit 101 for informing a CPU 31 of a time.

That is, in this embodiment, a bar code symbol label 1 stored in a frame memory 26 is decoded, and the decoding result is stored in a first symbol label memory 29A. Subsequently, the timer circuit 101 measures a time, and the bar code symbol label 1 is stored in the frame memory 26 and decoded again when a predetermined time elapses. After the decoding result is stored in a second symbol label memory 29B, the contents of the two symbol label memories 29A and 29B are synthesized, thereby restoring the contents of the two-dimensional bar code symbol label 1.

This embodiment has been made by focusing attention on the fact that the analog electric circuits, such as the imaging device 23 for imaging the bar code symbol label 1, the amplifier 24, and the A/D converter 25, do not constantly operate in the same ways due to noise or the like, so the contents stored in the frame memory 26 change each time. Therefore, synthesizing the contents of the two symbol label memories 29A and 29B is meaningful. Especially when a sheet or product on which a bar code symbol label 1 is attached is held against the bar code symbol reading apparatus by a human hand, it is impossible to reliably set the sheet or product in a stationary state, so the contents stored in the frame memory 26 change each time. Therefore, a satisfactory effect can be obtained simply by storing data in the frame memory 26 at different timings.

Note, in this embodiment, that the timer circuit 101 measures a time and the processing is performed by storing the bar code symbol label 1 in the frame memory again when a predetermined time elapses. However, the same effect can be obtained by storing the bar code symbol label 1 in the frame memory 26 again immediately after the decoding result is stored in the first symbol label memory 29A.

The above first to ninth embodiments have been described by taking a two-dimensional bar code symbol, such as CODE16K, CODE49, PDF417, or DATA CODE, as an example. However, it is also possible to constitute a bar code symbol reading apparatus capable of stably reading bar code symbol information by applying the present invention to so-called one-dimensional bar code symbols, such as a JAN/UPC/EAN code, an ITF (Interleaved 2 of 5) code, CODE39, an NW-7 code, and CODE128.

In addition, although it is considered general to use a CCD (Charge Coupled Device) array as the imaging device, the contents of the two-dimensional bar code symbol label 1 can be restored similarly by using a CMD (Charge Modulation Device). Note that the CMD is disclosed in "A NEW MOS IMAGE SENSOR OPERATING IN A NON-DESTRUCTIVE READOUT MODE", Manuscripts for the International Electron Device Meeting (IEDM) held in 1986, pp. 353 to 356. In some cases, it is also possible to miniaturize the two-dimensional bar code symbol reading apparatus by using this CMD.

In each of the above embodiments, the result of synthesis is stored in the first symbol label memory 29A, but it can be stored in the second symbol label memory 29B.

According to the present invention as has been described in detail above, it is possible to provide a bar code symbol reading apparatus capable of correctly reading bar code symbols, particularly two-dimensional bar code symbols.

That is, in the present invention, the decoding results of read signals of bar code symbols imaged twice or more are synthesized to restore the contents of the bar code symbol. This makes it possible to reliably and correctly read two-dimensional bar code symbols which are considered very difficult to read compared to one-dimensional bar code symbols.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A bar code symbol reading apparatus, comprising:
    condition-changing means for changing an imaging condition under which a bar code symbol will be imaged;
    imaging means for imaging same components of the bar code symbol at least twice by changing the imaging condition at least twice by said condition-changing means, thereby imaging the same components of the bar code symbol under at least two different imaging conditions, and producing at least two respective imaging results;
    decoding means for decoding said at least two imaging results of said imaging means to obtain at least two respective decoding results;
    at least two storing means for storing said at least two decoding results of said decoding means; and
    synthesizing means for synthesizing said at least two image results stored in said at least two storing means to produce a signal corresponding to the imaged bar code symbol.

2. The bar code symbol reading apparatus of claim 1, wherein said imaging means includes photoelectric conversion means for receiving light rays from the bar code symbol, and for outputting an electrical signal corresponding to a bar code symbol image indicated by the received light rays.

3. The bar code symbol reading apparatus of claim 2, wherein said condition-changing means comprises incident condition-changing means for changing an incident condition under which the light rays enter said photoelectric conversion means.

4. The bar code symbol reading apparatus of claim 3, wherein said incident condition-changing means further comprises means for changing an optical path so as to lead the light rays extending, at various angles, from the bar code means to said photoelectric conversion means.

5. The bar code symbol reading apparatus of claim 3, wherein said incident condition-changing means further comprises:
    at least two mirrors arranged to reflect the light rays extending, at various angles, from the bar code symbol; and
    leading means for selectively leading to said imaging device one of the light rays reflected by said at least two mirrors.

6. The bar code symbol reading apparatus of claim 3, wherein said incident condition-changing means further comprises position-changing means for changing relative relationships of the positions between the bar code symbol and said photoelectric conversion means.

7. The bar code symbol reading apparatus of claim 6, wherein said position-changing means comprises means for relatively moving said photoelectric conversion means and the bar code symbol along the optical path extending from said bar code symbol toward said photoelectric conversion means.

8. The bar code symbol reading apparatus of claim 6, wherein said position-changing means comprises means for relatively moving said photoelectric conversion means and the bar code symbol in a direction which intersects the optical path extending from the bar code symbol toward said photoelectric conversion means.

9. The bar code symbol reading apparatus of claim 6, wherein said position-changing means comprises means for changing an image-forming position on said photoelectric conversion means, in which the bar code symbol image is formed.

10. The bar code symbol reading apparatus of claim 6, wherein said position-changing means comprises rotating means for rotating at least one of said photoelectric conversion means and said bar code symbol so as to change a relative angle with the optical path, said rotating operation being performed within a plane which intersects the optical path extending from the bar code symbol toward said photoelectric conversion means.

11. The bar code symbol reading apparatus of claim 10, wherein said rotating operation is performed on the basis of at least two relative angles, a bar code symbol image formed by using one relative angle being identical to an image given by rotating at an angle of 90 degrees a bar code symbol image formed by using another relative angle.

12. The bar code symbol reading apparatus of claim 1, wherein:

said imaging means comprises lighting means for lighting up the bar code symbol; and said condition-changing means comprises incident condition-changing means for changing an incident condition under which the light rays are irradiated by said lighting means on said bar code symbol.

13. The bar code symbol reading apparatus of claim 12, wherein said incident condition-changing means includes means for changing a quantity of the light rays irradiated on said bar code symbol.

14. The bar code symbol reading apparatus of claim 12, wherein said incident condition-changing means includes means for changing a quantity of the light rays emitted by said lighting means.

15. The bar code symbol reading apparatus of claim 12, wherein said condition changing means includes means for changing an electrical-treatment condition under which the electrical signal output from said photoelectric conversion means is electrically treated.

16. The bar code symbol reading apparatus of claim 2, wherein:

said imaging means further comprises amplifying means for amplifying the electrical signal output from said photoelectric conversion means; and said condition-changing means includes gain-control means for changing a gain of said amplifying means.

17. The bar code symbol reading apparatus of claim 1, wherein said synthesizing means comprises:

means for comparing the contents between each and another of said at least two storing means; and means for storing, when said comparing means verifies that a decoding result, corresponding to one component of the bar code symbol, is stored in only one of said storing means, the decoding result for synthesizing.

18. The bar code symbol reading apparatus of claim 1, further comprising control means for controlling said decoding means so as to execute its second decode operation immediately after its first decode operation is terminated.

19. The bar code symbol reading apparatus of claim 1, further comprising control means for controlling said decoding means so as to execute a second decoding operation when a predetermined time has expired after a first decoding operation thereof is terminated.

* * * * *